US011457480B2

(12) United States Patent
Chai et al.

(10) Patent No.: US 11,457,480 B2
(45) Date of Patent: Sep. 27, 2022

(54) ASYNCHRONOUS UPLINK TRANSMISSION METHOD, DEVICE, AND STORAGE MEDIUM

(71) Applicant: Huawei Technologies Co., Ltd., Shenzhen (CN)

(72) Inventors: Xiaomeng Chai, Shanghai (CN); Yiqun Wu, Shanghai (CN); Lei Wang, Shanghai (CN); Xiuqiang Xu, Shanghai (CN); Yan Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 65 days.

(21) Appl. No.: 17/081,473

(22) Filed: Oct. 27, 2020

(65) Prior Publication Data

US 2021/0045163 A1 Feb. 11, 2021

Related U.S. Application Data

(63) Continuation of application No. PCT/CN2019/084721, filed on Apr. 28, 2019.

(30) Foreign Application Priority Data

Apr. 28, 2018 (CN) .......................... 201810400070.4

(51) Int. Cl.
*H04W 74/08* (2009.01)
*H04L 27/26* (2006.01)
(Continued)

(52) U.S. Cl.
CPC ....... *H04W 74/0833* (2013.01); *H04L 1/1819* (2013.01); *H04L 5/0051* (2013.01);
(Continued)

(58) Field of Classification Search
CPC ............. H04W 74/0833; H04W 76/11; H04W 72/042; H04W 72/0446; H04W 72/0453;
(Continued)

(56) References Cited

U.S. PATENT DOCUMENTS

2016/0044666 A1 2/2016 Shin et al.
2016/0255654 A1* 9/2016 Lin ....................... H04L 5/0048
                                                         370/329
(Continued)

FOREIGN PATENT DOCUMENTS

CN 104767594 A 7/2015
CN 106465401 A 2/2017
(Continued)

OTHER PUBLICATIONS

"3rd Generation Partnership Project; Technical Specification Group Radio Access Network; NR; Physical channels and modulation (Release 15)," 3GPP TS 38.211 V1.0.0, pp. 1-37, 3rd Generation Partnership Project, Valbonne, France (Sep. 2017).
(Continued)

*Primary Examiner* — Kent Krueger
(74) *Attorney, Agent, or Firm* — Leydig, Voit & Mayer, Ltd.

(57) ABSTRACT

This application provides an asynchronous uplink transmission method, a device, and a storage medium. The method includes: receiving, by a UE, configuration information that is of a first physical uplink shared channel (PUSCH) and that is sent by a network device, where the configuration information includes a length of a cyclic prefix (CP) of the first PUSCH, and the length of the CP of the first PUSCH is less than a length of a CP of a first random access preamble; determining, by the UE based on the length of the CP of the first PUSCH, a difference between a largest stored timing advance (TA) and a smallest stored TA, and a largest delay
(Continued)

spread, whether to send the first PUSCH; and responsive to determining to send the first PUSCH, sending, by the UE, the first PUSCH based on the configuration information of the first PUSCH.

9 Claims, 9 Drawing Sheets

(51) Int. Cl.
    *H04W 72/04*     (2009.01)
    *H04W 76/11*     (2018.01)
    *H04L 1/18*     (2006.01)
    *H04L 5/00*     (2006.01)

(52) U.S. Cl.
    CPC ....... *H04L 27/2607* (2013.01); *H04W 72/042* (2013.01); *H04W 72/0446* (2013.01); *H04W 72/0453* (2013.01); *H04W 72/0466* (2013.01); *H04W 76/11* (2018.02)

(58) Field of Classification Search
    CPC .............. H04W 72/0466; H04L 1/1819; H04L 5/0051; H04L 27/2607
    See application file for complete search history.

(56) References Cited

U.S. PATENT DOCUMENTS

2018/0198646 A1* 7/2018 Gau ..................... H04L 25/0202
2018/0242259 A1* 8/2018 Dinan ................... H04W 76/27
2020/0169960 A1* 5/2020 Dinan ................... H04W 52/54
2020/0322912 A1 10/2020 Zhang et al.

FOREIGN PATENT DOCUMENTS

| | | |
|---|---|---|
| CN | 106538012 A | 3/2017 |
| CN | 107409370 A | 11/2017 |
| CN | 107624260 A | 1/2018 |
| EP | 3105878 A1 | 12/2016 |
| EP | 3170276 A1 | 5/2017 |
| WO | 2015122701 A1 | 8/2015 |
| WO | 2016010217 A1 | 1/2016 |

OTHER PUBLICATIONS

"Physical channel design for 2-step RACH," 3GPP TSG RAN WG1 Meeting AH 1801, Vancouver, Canada, R1-1800727, pp. 1-4, 3rd Generation Partnership Project, Valbonne, France (Jan. 22-26, 2018).
"2-step Random Access Procedure," 3GPP TSG RAN WG1 AH_NR Meeting, Spokane, USA, R1-1700105, Total 10 pages, 3rd Generation Partnership Project, Valbonne, France (Jan. 16-20, 2017).
"Discussion on simplified RACH procedure," 3GPP TSG RAN WG1 Meeting #87, Reno, Nevada, USA, R1-1612468, Total 5 pages, 3rd Generation Partnership Project, Valbonne, France (Nov. 14-18, 2016).

* cited by examiner

| UE ID of the first UE | HARQ-ACK of the first UE | UE ID of the second UE | HARQ-ACK of the second UE | ... | UE ID of an $n^{th}$ UE | HARQ-ACK of the $n^{th}$ UE |
FIG. 13
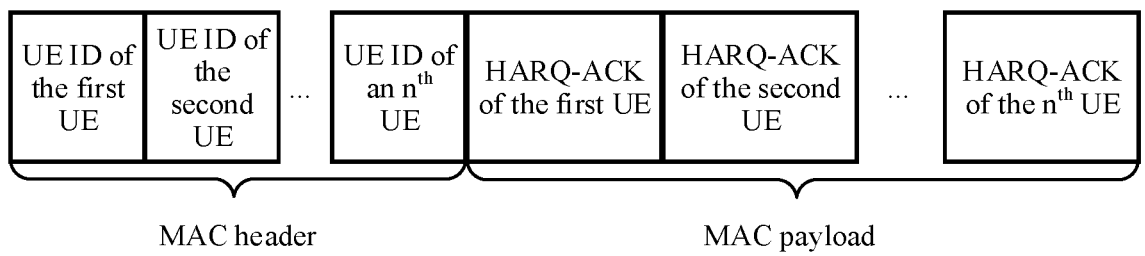
FIG. 14
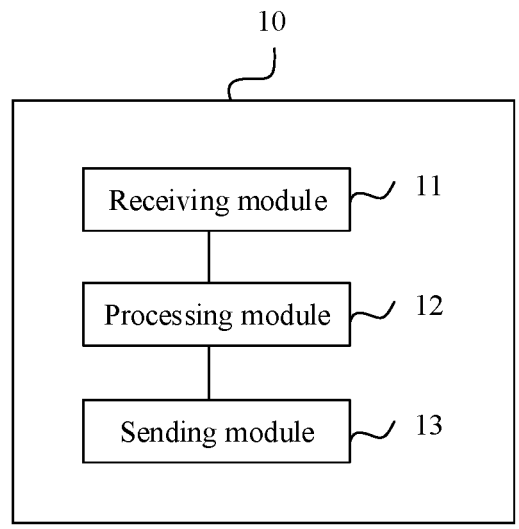
FIG. 15

ASYNCHRONOUS UPLINK TRANSMISSION METHOD, DEVICE, AND STORAGE MEDIUM

CROSS-REFERENCE TO RELATED APPLICATIONS

This application is a continuation of International Application No. PCT/CN2019/084721, filed on Apr. 28, 2019, which claims priority to Chinese Patent Application No. 201810400070.4, filed on Apr. 28, 2018. The disclosures of the aforementioned applications are hereby incorporated by reference in their entireties.

TECHNICAL FIELD

This application relates to the communications field, and in particular, to an asynchronous uplink transmission method, a device, and a storage medium.

BACKGROUND

In a wireless communications system such as a long term evolution (LTE) system or a 5G ($5^{th}$-Generation) new radio (NR) system, user equipment (UE) needs to enter an RRC connected mode from a radio resource control (RRC) idle mode or inactive mode through random access, to set up various bearers with a base station, and obtain some necessary resources and parameter configurations, thereby communicating with the base station.

Currently, in the wireless communications system such as the LTE system or the 5G NR system, it takes four steps for UE to perform random access. In the first step of four-step random access, the UE sends a message 1 (Msg1), and Msg1 is a random access preamble. In the second step, a base station estimates a timing advance (TA) of the UE by detecting the preamble, and delivers a TA value and grant information (random access response grant (RAR Grant)) of a message 3 (Msg3) to the UE through a RAR, that is, a message 2 (Msg2). In the third step, the UE sends the message 3 (Msg3) on a corresponding resource based on the received grant information, and Msg3 carries an RRC connection request and a UE identifier. In the fourth step, the base station performs contention resolution by sending a message 4 (Msg4), and Msg4 carries the UE identifier in Msg3 sent in the third step. For four-step random access in an existing system, when the UE in the idle mode or the inactive mode wants to perform uplink data transmission, the UE needs to first complete at least the four instances of information exchange to enter the RRC connected mode. For an ultra-reliable low-latency communication (URLLC) service, the four instances of information exchange generate a relatively high latency. This is unfavorable to a requirement for a low latency of URLLC. For a massive machine type communication (mMTC) service, most services are all for sporadic small packets, and the UE needs to perform the four-step random access each time to enter the RRC connected mode before sending data, and then returns to the idle mode or the inactive mode. This results in not only a relatively high latency but also relatively high signaling overheads. To reduce the latency and the signaling overheads of the four-step random access, it is proposed in the industry that Msg1 and Msg3 are combined and sent, and Msg2 and Msg4 are combined and sent. In other words, the four-step random access is shortened to a two-step random access. However, a PUSCH in Msg3 is sent in the first step in advance, and, at this moment, the UE has not obtained the TA, that is, has not completed uplink synchronization. Therefore, the UE needs to perform asynchronous uplink transmission. To ensure that signals are correctly received from UE at a cell edge and UE in a cell center, a length of a cyclic prefix (CP) of the PUSCH in Msg1 is set to be the same as a length of a CP of the preamble. If the length of the CP of the PUSCH in Msg1 is the same as the length of the CP of the preamble, CP overheads are very high. For example, for a preamble in a format 0, a length of a CP is 3168 Ts, a length of a data symbol of 15 kHz is 2048 Ts, and consequently, CP overheads are approximately 155%.

In conclusion, in a current two-step random access process, data is transmitted in Msg 1. At this moment, the UE does not perform uplink synchronization, that is, obtain an accurate TA. To avoid interference between symbols and interference between subcarriers, a large enough CP is needed to ensure orthogonality between the symbols and between the subcarriers. Generally, a CP whose length is the same as that of the CP of the preamble is used. Consequently, a time length of a data symbol is far less than the length of the CP of the preamble, causing extremely high CP overheads.

SUMMARY

This application provides an asynchronous uplink transmission method, a device, and a storage medium, to resolve a problem that CP overheads are extremely high in a current two-step random access process.

According to a first aspect, this application provides an asynchronous uplink transmission method. The method includes:

receiving, by UE, configuration information of a first PUSCH from a network device, where the configuration information includes a length of a CP of the first PUSCH, and the length of the CP of the first PUSCH is less than a length of a CP of a first random access preamble;

determining, by the UE based on the length of the CP of the first PUSCH, a difference between a largest stored TA and a smallest stored TA, and a largest delay spread, whether to send the first PUSCH; and if determining to send the first PUSCH, sending, by the UE, the first PUSCH based on the configuration information of the first PUSCH.

In a specific implementation, the configuration information further includes resource configuration information of the first PUSCH.

In another specific implementation, the method further includes:

if a difference between the length of the CP of the first PUSCH and the largest delay spread is less than the difference between the largest stored timing advance TA and the smallest stored timing advance TA, skipping, by the UE, sending the first PUSCH.

In another specific implementation, the determining, by the UE based on the length of the cyclic prefix CP of the first PUSCH, a length of a guard time GT of the first PUSCH, the difference between the largest stored timing advance TA and the smallest stored TA, and the largest delay spread, whether to send the first PUSCH includes:

if a difference between the length of the CP of the first PUSCH and the largest delay spread is less than the difference between the largest stored TA and the smallest stored TA, or the length of the GT is less than the difference between the largest stored TA and the smallest stored TA, determining not to send the first PUSCH.

Based on any one of the foregoing solutions, the sending, by the UE, the first PUSCH based on the configuration information of the first PUSCH includes:

in a specific implementation of adjusting, by the UE, uplink timing based on the smallest stored TA, the UE may adjust a timing advance of the UE to the smallest stored TA.

In another implementation, the method further includes:

sending a second random access preamble based on the adjusted uplink timing. In this solution, it should be understood that a length of a CP of the second random access preamble may be the same as or different from the length of the CP of the first random access preamble, or may be the same as the length of the CP of the first PUSCH.

Optionally, the first PUSCH carries an identity ID of the UE.

According to a second aspect, this application provides an asynchronous uplink transmission method. The method includes:

sending, by a network device, configuration information of a physical uplink shared channel PUSCH used for asynchronous uplink transmission, where the configuration information includes a length of a CP of the PUSCH, and the length of the CP of the PUSCH is less than a length of a CP of a random access preamble; and receiving, by the network device, the PUSCH sent based on the configuration information of the PUSCH.

In a specific implementation, the configuration information further includes resource configuration information of the PUSCH.

According to a third aspect, this application further provides user equipment, including:

a receiving module, configured to receive configuration information of a first PUSCH from a network device, where the configuration information includes a length of a CP of the first PUSCH, and the length of the CP of the first PUSCH is less than a length of a CP of a first random access preamble;

a processing module, configured to determine, based on the length of the CP of the first PUSCH, a difference between a largest stored timing advance TA and a smallest stored TA, and a largest delay spread, whether to send the first PUSCH; and a sending module, configured to send, if it is determined to send the first PUSCH, the first PUSCH based on the configuration information of the first PUSCH.

Optionally, the processing module is further configured to:

if a difference between the length of the CP of the first PUSCH and the largest delay spread is less than the difference between the largest stored timing advance TA and the smallest stored timing advance TA, skip sending the first PUSCH.

Optionally, the processing module is further configured to:

if a difference between the length of the CP of the first PUSCH and the largest delay spread is less than the difference between the largest stored TA and the smallest stored TA, or the length of the GT is less than the difference between the largest stored TA and the smallest stored TA, determine not to send the first PUSCH.

Optionally, the first PUSCH carries an identity ID of the UE.

According to a fourth aspect, this application provides a network device, including:

a sending module, configured to send configuration information of a PUSCH used for asynchronous uplink transmission, where the configuration information includes a length of a CP of the PUSCH, and the length of the CP of the PUSCH is less than a length of a CP of a random access preamble; and a receiving module, configured to receive the PUSCH sent based on the configuration information of the PUSCH.

According to a fifth aspect, this application provides user equipment. The user equipment includes a transmitter, a receiver, a memory, and a processor, where the memory is configured to store a computer program, and the processor executes the computer program to implement the asynchronous uplink transmission method according to any implementation of the first aspect.

According to a sixth aspect, this application provides a network device. The network device includes a transmitter, a receiver, a memory, and a processor, where the memory is configured to store a computer program, and the processor executes the computer program to implement the asynchronous uplink transmission method according to any implementation of the second aspect.

According to a seventh aspect, this application provides a storage medium. The storage medium is configured to store a computer program, and the computer program is configured to implement the asynchronous uplink transmission method according to any implementation of the first aspect.

According to an eighth aspect, this application provides a storage medium. The storage medium is configured to store a computer program, and the computer program is configured to implement the asynchronous uplink transmission method according to any implementation of the second aspect.

According to a ninth aspect, this application provides a computer program product. When the computer program product is run on a computer, the computer is enabled to perform the technical solution in any implementation of the first aspect.

According to a tenth aspect, this application provides a computer program product. When the computer program product is run on a computer, the computer is enabled to perform the technical solution in any implementation of the second aspect.

According to an eleventh aspect, this application further provides a communications system, including the user equipment according to any implementation of the third aspect and the network device according to any one of the fourth aspect.

According to the asynchronous uplink transmission method, the device, and the storage medium provided in this application, the UE receives the configuration information that is of the first PUSCH and that is sent by the network device, where the configuration information includes the length of the cyclic prefix CP of the first PUSCH, and the length of the CP of the first PUSCH is less than the length of the CP of the first random access preamble. The UE determines, based on the length of the CP of the first PUSCH, the difference between the largest stored timing advance TA and the smallest stored TA, and the largest delay spread, whether to send the first PUSCH. If determining to send the first PUSCH, the UE sends the first PUSCH based on the configuration information of the first PUSCH. CP overheads of the UE that meets a condition for using a frame structure of the PUSCH are reduced, and resource utilization is improved.

BRIEF DESCRIPTION OF DRAWINGS

FIG. 13 is still another schematic diagram of a format of Msg2, as a feedback for a PUSCH, for a plurality of UEs according to this application;

FIG. 14 is yet another schematic diagram of a format of Msg2, as a feedback for a PUSCH, for a plurality of UEs according to this application;

FIG. 15 is a schematic structural diagram of Embodiment 1 of user equipment according to this application.

DESCRIPTION OF EMBODIMENTS

Figure 1:
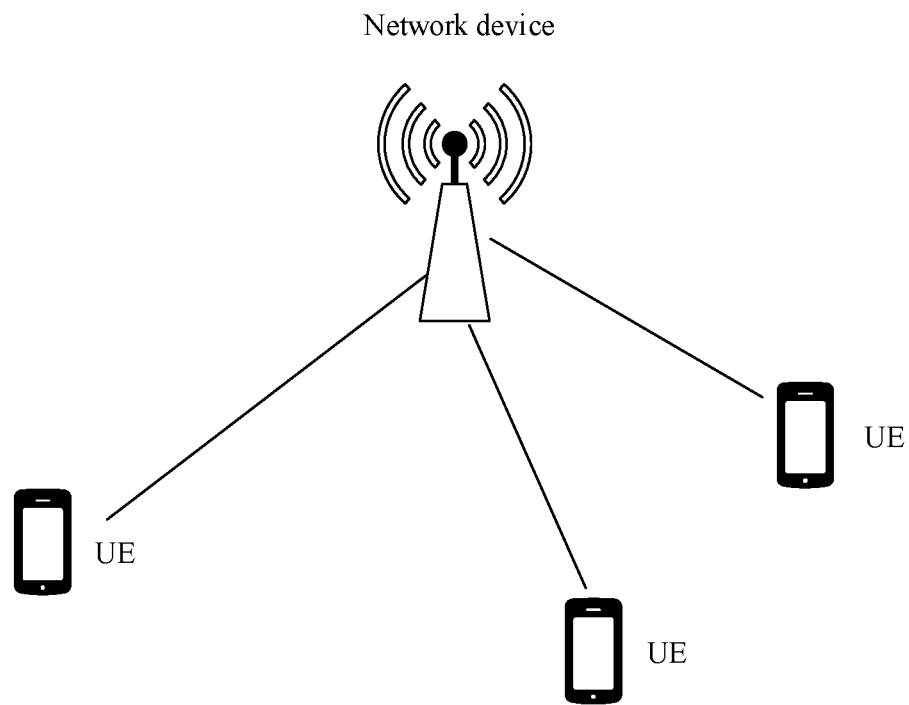
FIG. 1 is a schematic diagram of a communications system according to this application.

A random access solution provided in this application may be applied to a wireless communications system, for example, a scenario such as a new radio (NR) scenario, a long term evolution (LTE) next-generation scenario, a wireless local area network (WLAN) scenario, or a Bluetooth communication scenario. For ease of description, the new radio scenario is used as an example for description in embodiments of this application. FIG. 1 is a schematic diagram of a communications system according to this application. As shown in FIG. 1, a new radio access network (where a function entity in the new radio access network is mainly a network device) and user equipment that communicates with the network device in the new radio access network may be included in the NR scenario. In addition, a relay device and user equipment connected to the relay device may be further included in the NR scenario. The relay device establishes a connection to the network device. Therefore, relative to the network device, the relay device may also be considered as user equipment. The relay device establishes a connection to the user equipment. Therefore, relative to the user equipment, the relay device may also be considered as a network device. A person skilled in the art may understand that the network device in this application may also include a relay device, and the user equipment in this application may also include a relay device. The network device may be specifically any one of or a combination of a gNB, a new radio eNB, a transmission and reception point (TRP), a macro base station, a micro base station, a high-frequency base station, an LTE macro or micro eNB, a CPE, a WLAN AP, a WLAN GO, and the like. For example, the network device may be a gNB, and the gNB implements a function of the network device in this application. Alternatively, the network device is a combination of a gNB and a TRP. For example, the gNB implements a resource configuration function of the network device in this application, and the TRP implements sending and receiving functions of the network device in this application. This application is not limited thereto. The user equipment may be a mobile phone, a tablet computer, a smart automobile, a sensing device, an internet of things (IOT) device, customer-premises equipment (CPE), a relay base station, or the like.

Figure 2:
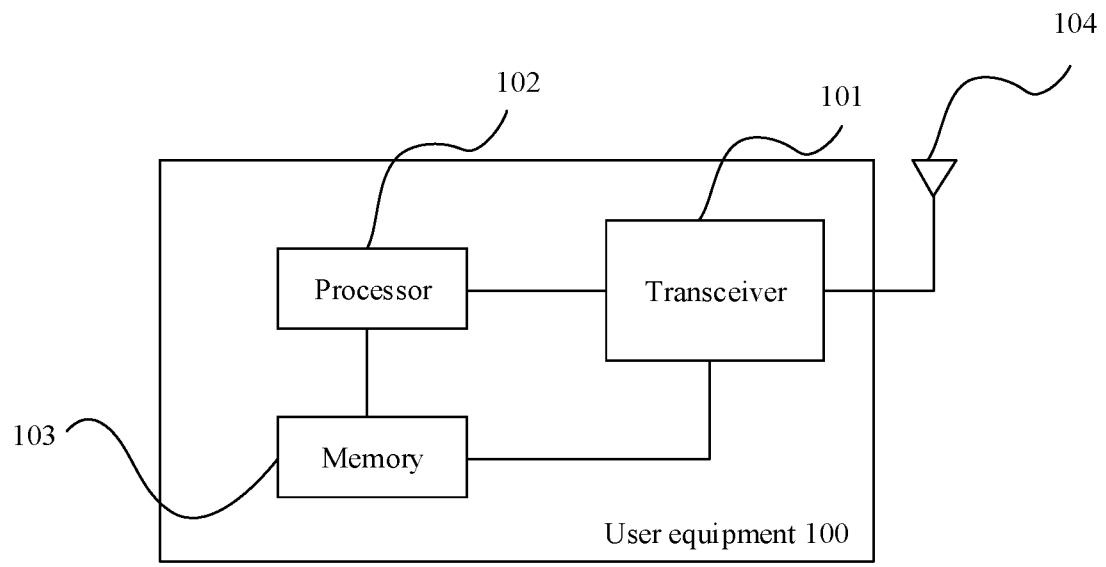
FIG. 2 is a schematic structural diagram of user equipment according to this application.

This application relates to the user equipment and the network device. The user equipment is, for example, 5G UE (e.g., a UE that supports a next-generation mobile communications standard), or another 5G terminal device. FIG. 2 is a schematic structural diagram of user equipment according to this application. As shown in FIG. 2, the user equipment 100 may include one or more transceivers 101, one or more antennas 104, one or more processors 102, and one or more memories 103. The user equipment performs a method performed by user equipment in any embodiment provided in this application.

Figure 3:
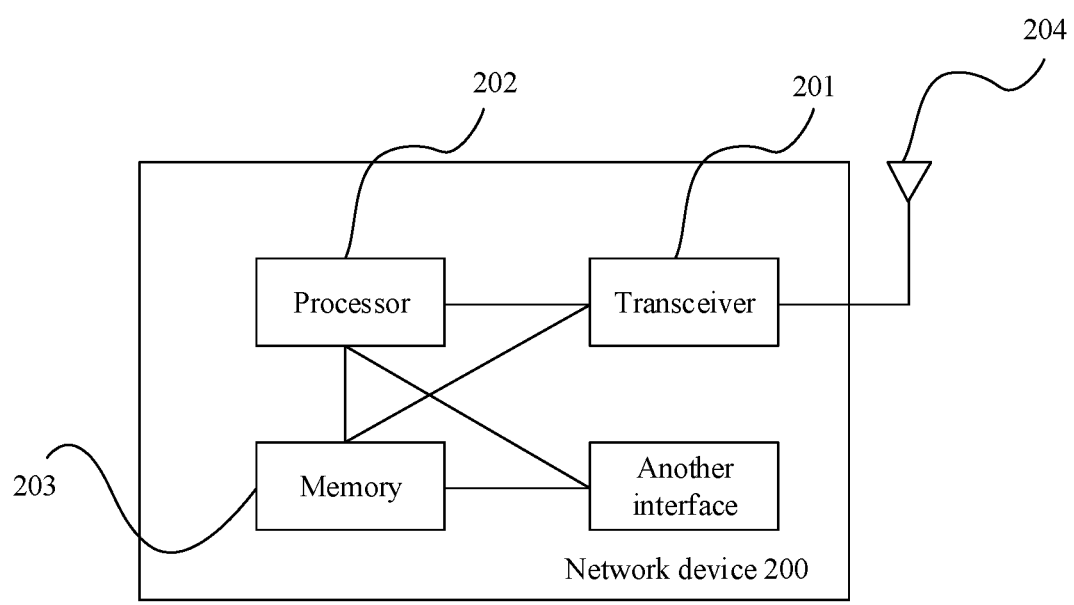
FIG. 3 is a schematic structural diagram of a network device according to this application.

The network device is, for example, a 5G gNB (e.g., a base station in a next-generation mobile communications network), a transmission reception point (TRP), or a network device (such as a micro base station) in another 5G access network. FIG. 3 is a schematic structural diagram of a network device according to this application. As shown in FIG. 3, the network device 200 may include one or more transceivers 201, one or more antennas 204, one or more processors 202, and one or more memories 203. Further, the network device 200 may further include one or more other interfaces 205 (e.g., a fiber link interface, an Ethernet interface, and/or a copper wire interface). The network device can perform a method performed by a network device in any embodiment provided in this application.

Figure 4:
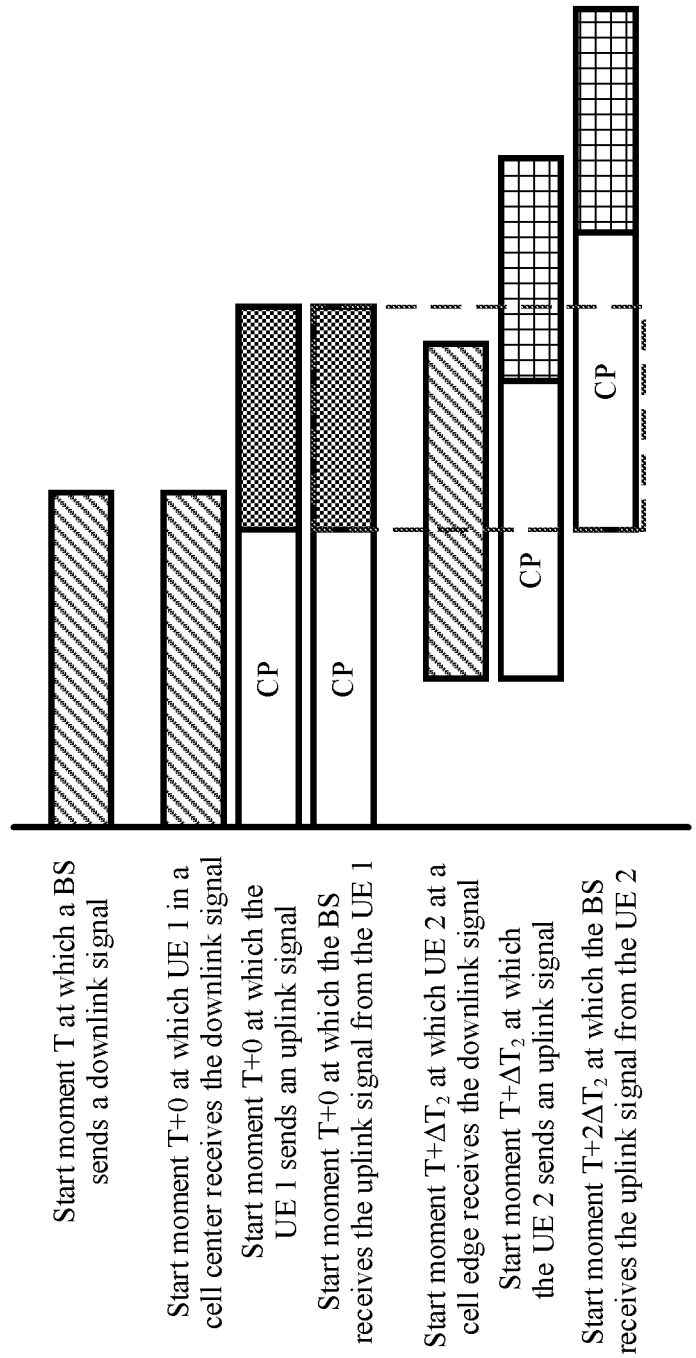
FIG. 4 is a schematic diagram of CP overheads for asynchronous transmission according to this application.

To reduce a latency and signaling overheads of four-step random access, it is proposed that in a random access process, Msg1 and Msg3 are combined and sent, and Msg2 and Msg4 are combined and sent. In other words, a four-step random access is shortened to a two-step random access. However, a PUSCH in Msg3 is sent in the first step in advance, and at this moment, UE has not obtained a TA, that is, has not completed uplink synchronization. Therefore, the UE needs to perform asynchronous uplink transmission. To avoid interference between symbols and interference between subcarriers, a large enough CP is needed to ensure orthogonality between the symbols and between the subcarriers. Generally, a CP the same as that of a preamble in Msg1 is used. In other words, a length of the CP is approximately equal to a round-trip time of a maximum cell radius plus a delay spread. FIG. 4 is a schematic diagram of CP overheads for asynchronous transmission according to this application. As shown in FIG. 4, to ensure that signals sent by UE 2 at a cell edge and UE 1 in a cell center can be correctly received by a base station BS, a length, of a CP, the same as that of the preamble is used for a PUSCH in Msg1. A start moment at which the base station BS sends a downlink signal is T, a start moment at which the UE 1 in the cell center receives the downlink signal is T+0, a start moment at which the UE 1 sends an uplink signal is also T+0, a start moment at which the BS receives the uplink signal sent by the UE 1 is also T+0, a start moment at which the UE 2 at the cell edge receives the downlink signal is T+$\Delta T_2$, a start moment at which the UE 2 sends an uplink signal is $T+\Delta T_2$, and a start time at which the BS receives the uplink signal from the UE 2 is $T+2\Delta T_2$. It can be learned from the figure that, after the length of the CP being the same as that of the preamble used for the PUSCH in Msg1, data symbols in Msg1 separately sent by the UE 1 and the UE 2 do not interfere with each other when arriving at the base station BS. However, in this manner, a subcarrier spacing of data is far greater than a subcarrier spacing of the preamble. Consequently, a time length of the data symbol is far less than the length of the CP of the preamble, and CP overheads are extremely high. Therefore, a problem that needs to be resolved in the two-step random access is mainly to reduce a CP overhead problem. For example, for a preamble in a format 0, a length of a CP is 3168 Ts, a length of a data symbol of 15 kHz is 2048 Ts, and consequently, the length of the CP in a subframe is 155% of the length of the data symbol.

Actually, in an mMTC scenario, movement ranges of most UEs are fixed and are far less than the maximum cell radius. Therefore, in the mMTC scenario, the length of the CP does not need to depend on the maximum cell radius, and only needs to be greater than a TA difference corresponding to a maximum movement range of a UE that performs the two-step random access. The TA difference is generally far less than a round-trip time of the maximum cell radius. Therefore, CP overheads can be greatly reduced. The movement range of the UE may be determined by collecting statistics on TA information of the UE.

When a network device (e.g., a base station) configures a length of a CP that is less than the round-trip time of the maximum cell radius, it does not mean that all UEs in a cell can perform uplink transmission by using this CP configuration, and the CP configuration can be used for uplink transmission only when a sum of a maximum TA change difference of the UE and a delay spread does not exceed the length of the CP. Therefore, if all the UEs in the cell use the CP configuration for uplink transmission, because a signal from UE that does not meet a condition destroys orthogonality between subcarriers and symbols of received signals at a receive end, signals from all the UEs may not be correctly received.

Therefore, this application provides an asynchronous uplink transmission method. A base station configures a length of a CP through obtained historical TA information of all UEs, to reduce CP overheads. In addition, a UE determines, based on an obtained CP configuration and historical TA information of the UE, whether to use two-step random access. In this way, differences between times at which signals from all UEs that perform two-step random access arrive at the base station are all less than the length that is of the CP and that is configured by the base station, thereby ensuring orthogonality between symbols and subcarriers.

In addition, in the mMTC scenario, most services are all for sporadic small packets. If data transmission can be completed in a random access process, the UE does not need to enter an RRC connected mode. Therefore, a preamble in Msg1 is not mandatory. Only data in Msg1 may be sent, and no preamble is sent, to further reduce random access overheads.

Figure 5:
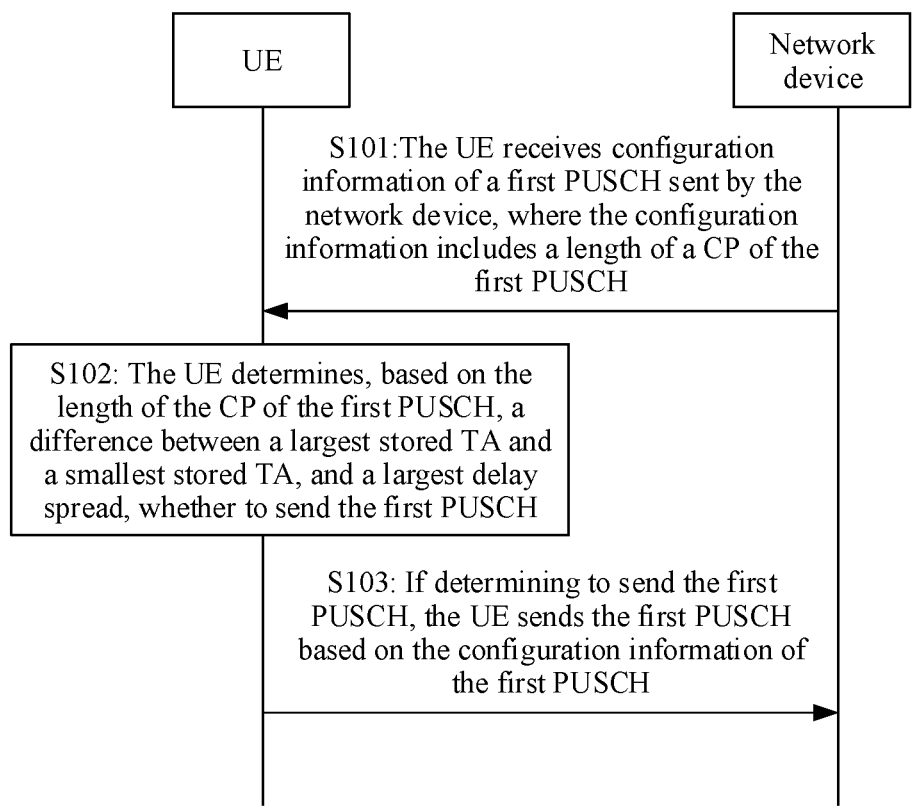
FIG. 5 is a flowchart of Embodiment 1 of an asynchronous uplink transmission method according to this application.

FIG. 5 is a flowchart of Embodiment 1 of an asynchronous uplink transmission method according to this application. As shown in FIG. 5, the asynchronous uplink transmission method provided in this embodiment specifically includes the following several steps.

S101: A UE receives configuration information that is of a first PUSCH and that is sent by a network device, where the configuration information includes a length of a CP of the first PUSCH.

In this step, the network device sends, based on obtained TA information of all UEs, configuration information of a PUSCH used for asynchronous uplink transmission. Specifically, the network device may send the configuration information of the PUSCH to all the UEs in a cell in a broadcast manner. The configuration information of the PUSCH includes a length of a CP of the PUSCH. In a specific implementation of this solution, the network device may configure the length of the CP by configuring a frame structure of the first PUSCH.

The UE receives the configuration information of the PUSCH, namely, the configuration information of the first PUSCH, that is broadcast by the network device. The configuration information includes at least a configuration of the length of the CP of the first PUSCH, and the length of the CP of the first PUSCH is less than a length of a CP of the first random access preamble. In an embodiment, the configuration information of the first PUSCH may further include resource configuration information of the first PUSCH, and the resource configuration information of the first PUSCH may include one or more of the following information: time-frequency resource information, configuration information of a demodulation reference signal, a modulation and coding scheme (MCS), a power control parameter, and other transmission parameters. In another embodiment, the resource configuration information of the first PUSCH may alternatively be pre-agreed upon (e.g., specified in a protocol standard) by the UE and the network device. This is not limited in this solution.

S102: The UE determines, based on the length of the CP of the first PUSCH, a difference between a largest stored TA and a smallest stored TA, and a largest delay spread, whether to send the first PUSCH.

In this step, the largest delay spread is determined based on information such as a cell radius and a channel state. In a specific application process, the largest delay spread may be replaced with a length of a CP of a third PUSCH.

After obtaining the length that is of the CP and that is configured by the network device, the user equipment may determine, based on a value relationship between the length of the CP and a sum of the largest delay spread and the difference between the largest stored TA and the smallest stored TA, whether to send the first PUSCH based on the configuration information that is of the PUSCH and that is configured by the network device. Specific determining manners include at least the following several manners.

In a first determining manner, if a guard time (GT) does not need to be inserted at an end of a subframe, whether to send the first PUSCH may be determined by comparing a difference between the length of the CP of the first PUSCH and the largest delay spread with the difference between the largest stored TA and the smallest stored TA. Specifically, if the difference between the length of the CP of the first PUSCH and the largest delay spread is greater than or equal to the difference between the largest stored TA and the smallest stored TA, the UE determines to send the first PUSCH. If the difference between the length of the CP of the first PUSCH and the largest delay spread is less than the difference between the largest stored TA and the smallest stored TA, the UE determines not to send the first PUSCH.

The network device may configure a frame structure of the PUSCH for the UE through the configuration information of the PUSCH, that is, the configuration information of the PUSCH includes configuration information of the frame structure of the PUSCH. In a configured PUSCH frame structure, a GT does not need to be inserted at the end of the subframe. In another configured PUSCH frame structure, a GT needs to be inserted at the end of the subframe.

When a GT does not need to be inserted at the end of the subframe, if the received length of the CP is greater than or equal to the sum of the largest delay spread and the difference between the largest TA and the smallest TA that are stored in the UE, asynchronous uplink transmission is performed by using the frame structure that is of the first PUSCH and that is configured by the network device. If the received length of the CP is less than the sum of the largest delay spread and the difference between the largest TA and the smallest TA that are stored in the UE, the frame structure used for the first PUSCH is not used.

In a second determining manner, if a GT needs to be inserted at the end of the subframe, the UE may determine, based on the length of the CP of the first PUSCH, a length of a GT of the first PUSCH, the difference between the largest stored TA and the smallest stored TA, and the largest delay spread, whether to send the first PUSCH. Specifically, if a difference between the length of the CP of the first PUSCH and the largest delay spread is greater than or equal to the difference between the largest stored TA and the smallest stored TA, and the length of the GT is greater than or equal to the difference between the largest stored TA and the smallest stored TA, the UE determines to send the first PUSCH. If the difference between the length of the CP of the first PUSCH and the largest delay spread is less than the difference between the largest stored TA and the smallest stored TA, or the length of the GT is less than the difference between the largest stored TA and the smallest stored TA, the UE determines not to send the first PUSCH.

When a GT needs to be inserted at the end of the subframe, if the received length of the CP is greater than or equal to the sum of the largest delay spread and the difference between the largest TA and the smallest TA that are stored in the UE, and the length of the GT is greater than or equal to the difference between the largest TA and the smallest TA that are stored in the UE, asynchronous uplink transmission is performed by using the frame structure of the first PUSCH. If the received length of the CP is less than the sum of the largest delay spread and the difference between the largest TA and the smallest TA that are stored in the UE, or the length of the GT is less than the difference between the largest TA and the smallest TA that are stored in the UE, the frame structure of the first PUSCH is not used.

S103: Responsive to determining to send the first PUSCH, the UE sends the first PUSCH based on the configuration information of the first PUSCH.

In this step, if the UE determines to send the first PUSCH, the UE may send the first PUSCH by using the configuration information that is of the PUSCH and that is configured by the network device. In other words, the UE performs asynchronous uplink transmission by using the length of the CP that is of the first PUSCH and that is configured by the network device. In a specific implementation, if the network device configures the length of the CP by configuring the frame structure of the first PUSCH, asynchronous uplink transmission may be directly performed by using the frame structure that is of the first PUSCH and that is configured by the network device. The asynchronous uplink transmission method in this embodiment of this application may be applied to a two-step random access process or uplink transmission without dynamic grant.

In an embodiment, the UE may send the first PUSCH and the random access preamble.

In another embodiment, when the UE sends the first PUSCH, the first PUSCH may include only data and does not include the random access preamble. The data may include an identity (ID) of the UE, so that the network device determines, when receiving the data, which UE sends the data.

According to the asynchronous uplink transmission method provided in this embodiment, the network device configures configuration information of a PUSCH with relatively low overheads based on the TAs of all the UEs. The configuration information of the PUSCH includes the length of the CP. After receiving the configuration information of the PUSCH, the user equipment may determine, based on the largest TA value and the smallest TA value that are stored in the user equipment, the length of the CP of the third PUSCH, and the length of the CP of the first PUSCH, whether to use the PUSCH in the configuration information for transmission. The third PUSCH is a PUSCH used for synchronous uplink transmission. For example, the third PUSCH may be a PUSCH defined in the existing communications protocol 3GPP TS38.211. CPs of the third PUSCH are classified into two types: a common CP and an extended CP. For example, a length of the common CP may be 144 Ts or 160 Ts, and a length of the extended CP may be 512 Ts. When two-step random access needs to be performed, whether to perform two-step random access by using the length of the CP that is of the first PUSCH and that is configured by the network device is determined based on the largest TA value and the smallest TA value that are stored in the UE, the largest delay spread, and the like. In this way, CP overheads of the UE that meets a condition for using the configuration information of the PUSCH can be reduced, and resource utilization can be improved. In addition, UE that does not meet the condition for using the configuration information of the PUSCH can be prevented from abusing the frame structure that is of the PUSCH and that is configured by the network device, not to cause interference to another user.

Based on the foregoing embodiment, in a specific implementation in which the UE determines to send the first PUSCH by using the configuration information that is of the first PUSCH and that is configured by the network device, the UE may adjust uplink timing of the UE based on the smallest stored TA. In a specific implementation, the UE may adjust a timing advance of the UE to the smallest stored TA. Then, the UE sends the first PUSCH based on the adjusted uplink timing. Using the two-step random access process as an example, the UE may send a second random access preamble based on the adjusted uplink timing to perform random access. In this solution, it should be understood that a length of a CP of the second random access preamble may be the same as or different from the length of the CP of the first random access preamble, or may be the same as the length of the CP of the first PUSCH. This is not limited in this solution.

In conclusion, if the UE determines to use the frame structure that is configured by the network device and that is used for the first PUSCH, the UE adjusts the uplink timing based on the historical smallest TA value stored in the UE, and generates the CP based on a received CP configuration.

Based on any one of the foregoing embodiments, if determining not to send the first PUSCH, the UE sends the first random access preamble and/or a second PUSCH to the network device, where a length of a CP of the second PUSCH is greater than or equal to the length of the CP of the first random access preamble. To be specific, when the UE determines not to use the first PUSCH configured by the network device, the UE may resend the first random access preamble to perform a random access process, to implement data transmission, or perform asynchronous uplink data transmission by using a relatively long CP with relatively high overheads.

The following describes the solution in detail by using the base station and the UE 1 and the UE 2 in coverage of the base station as an example, where the base station broadcasts a frame structure used for the first PUSCH (represented by a Msg1 PUSCH in the following descriptions) in a broadcast message, and the frame structure includes a configuration of the length of the CP of the first PUSCH.

Figure 6:
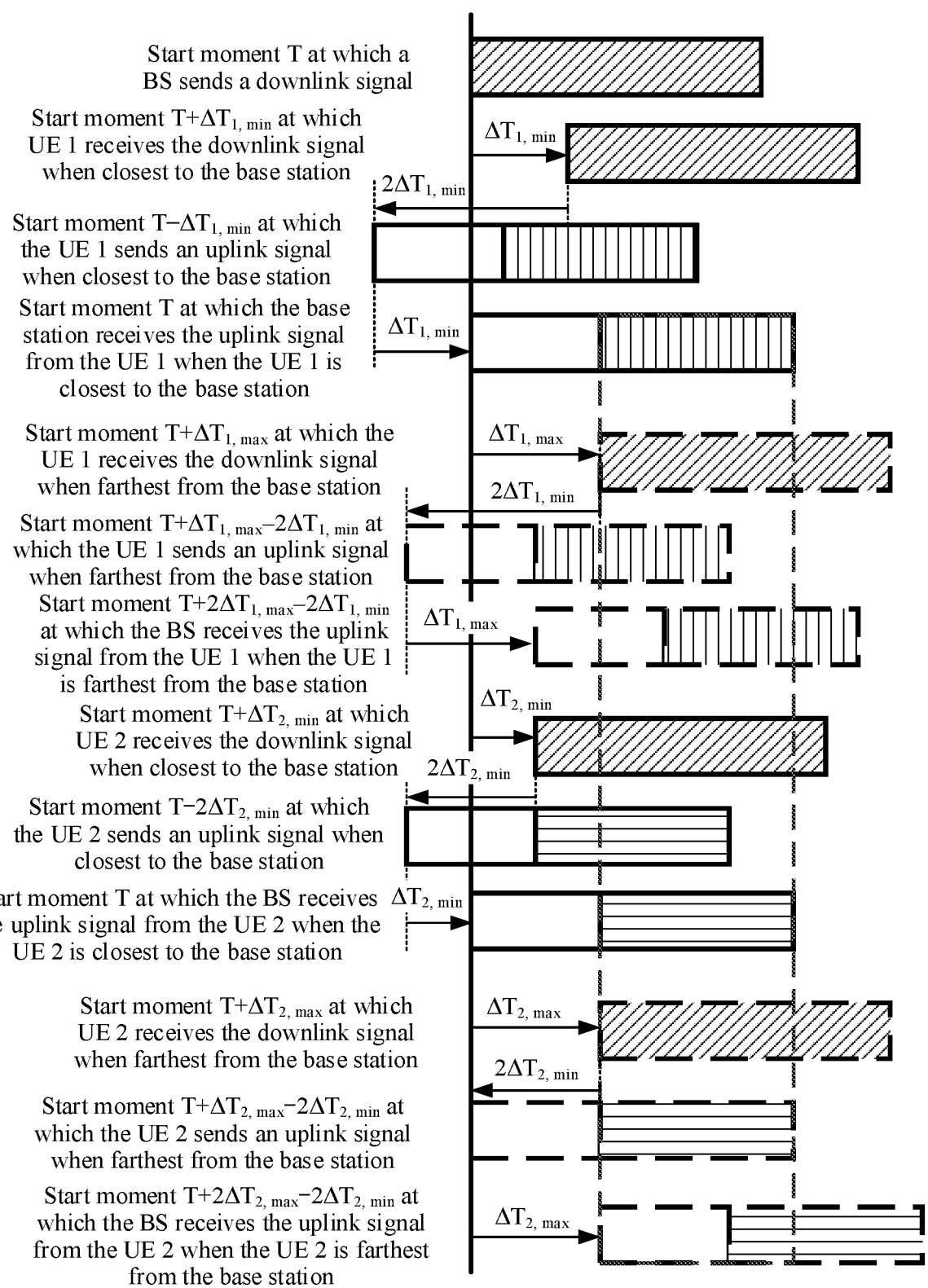
FIG. 6 is a schematic diagram of uplink timing adjustment in an asynchronous uplink transmission method according to this application.

FIG. 6 is a schematic diagram of uplink timing adjustment in an asynchronous uplink transmission method according to this application. As shown in FIG. 6, the UE 1 and the UE 2 are two users that meet a condition for using the frame structure of the first PUSCH, and a largest historical TA difference, that is, a difference between a largest TA value $TA_{2,\ max}$ and a smallest TA value $TA_{2,\ min}$ of the UE 2 is exactly equal to a length $T_{CP}^{Msg1PUSCH}$ of a CP transmitted on the first PUSCH that is broadcast by the base station, that is, $TA_{2,\ max}-YA_{2,\ min}=T_{CP}^{Msg1PUSCH}$. For ease of description, it is assumed herein that a largest delay spread is equal to 0. When the UE 1 is closest to the base station, a time required for transmitting a signal between the base station and the UE 1 is $\Delta TA_{1,\ min}$. Therefore, a historical smallest TA value of the UE 1 satisfies $TA_{1,\ max}=2\Delta TA_{1,\ min}$, and similarly, $TA_{2,\ min}=2\Delta TA_{2,\ min}$. When the UE 1 is farthest from the base station, a time required for transmitting a signal between the base station and the UE 1 is $\Delta TA_{1,\ max}$. Therefore, a historical largest TA value of the UE 1 satisfies $TA_{1,\ max}=2\Delta TA_{1,\ max}$, and similarly, $TA_{2,\ max}=2\Delta TA_{2,\ max}$.

When the base station sends a downlink signal at a moment T, and the UE 1 is closest to the base station, the downlink signal arrives at the UE 1 at $T+\Delta T_{1,\ min}$, the UE 1 adjusts a timing advance to a historical smallest TA value $TA_{1,\ min}=2\Delta TA_{1,\ min}$ stored in the UE 1, that is, sends an uplink signal at a moment $T+\Delta T_{1,\ min}-2\Delta T_{1,\ min}=T-\Delta T_{1,\ min}$, and the base station receives the uplink signal from the UE 1 at a moment $T+\Delta T_{1,\ min}-\Delta T_{1,\ min}=T$. Similarly, when the UE 1 is farthest from the base station, the base station receives an uplink signal from the UE 1 at a moment $T+2\Delta T_{1,\ max}-2\Delta T_{1,\ min}$. When the UE 2 is farthest from the base station, the base station receives an uplink signal from the UE 2 at the moment T. When the UE 2 is closest to the base station, the base station receives an uplink signal from the UE 1 at a moment $T+2\Delta T_{2,\ max}-2\Delta T_{2,\ min}$. The base station starts a fast Fourier transformation (FFT) window at a moment $T+T_{CP}^{Msg1PUSCH}$. As can be seen from the figure, in any case, the base station may detect a complete uplink signal in the FFT window. In addition, a largest time domain signal shift, resulting from asynchronous transmission, of a signal received on a base station side does not exceed the length of the CP of the first PUSCH. As a result, interference between symbols is not caused, and CP overheads are far lower than those in the prior art.

Figure 7:
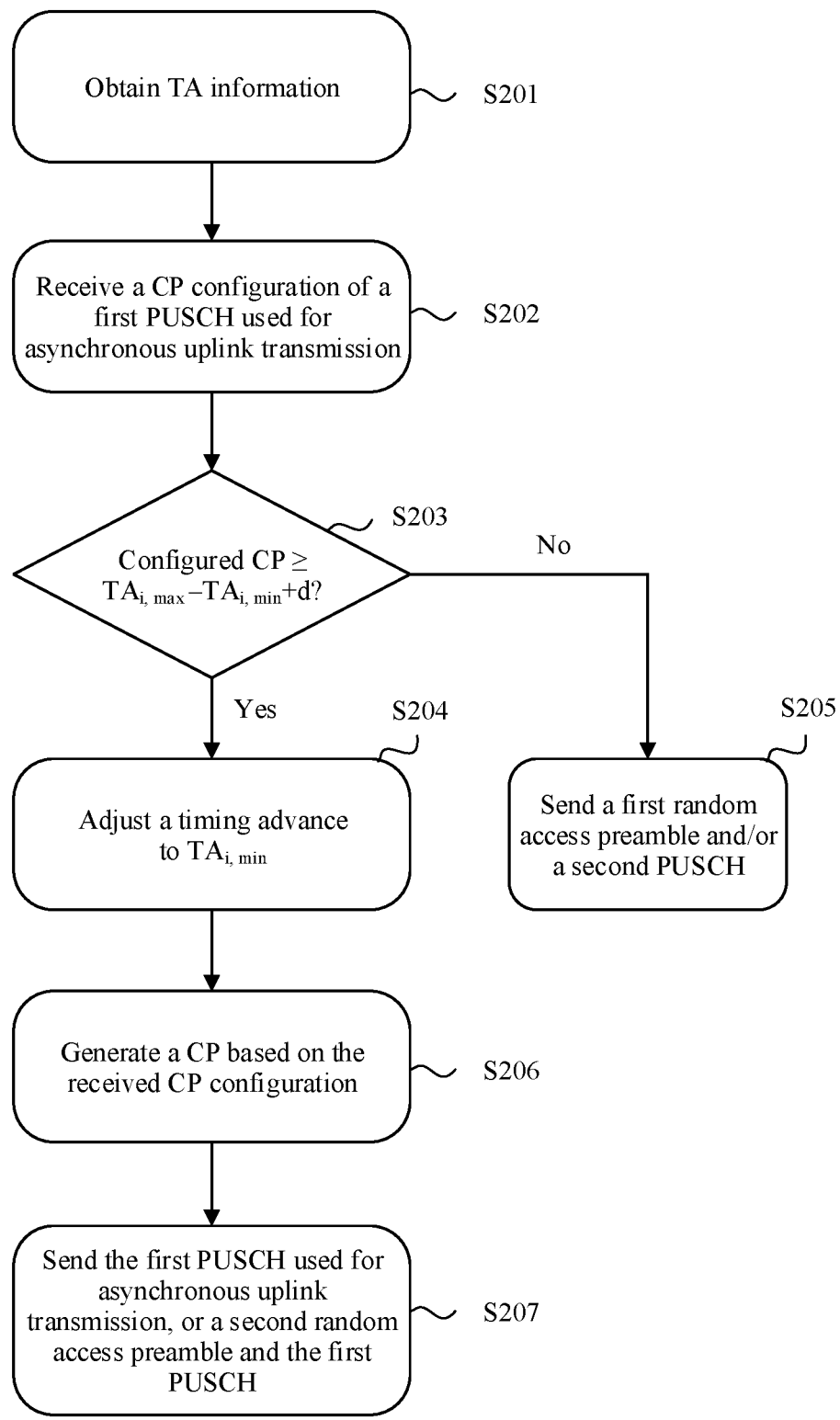
FIG. 7 is a flowchart of Embodiment 2 of an asynchronous uplink transmission method according to this application.

Based on the foregoing embodiment, FIG. 7 is a flowchart of Embodiment 2 of an asynchronous uplink transmission method according to this application. As shown in FIG. 7, in a specific implementation, the asynchronous uplink transmission method mainly includes the following steps on a UE side.

S201: Obtain TA information.

Before performing asynchronous uplink transmission, UE may obtain valid TA information in a historical random access process or a historical data transmission process, and store valid TA information obtained each time. The valid TA information herein refers to a TA value that can enable the UE to correctly perform uplink transmission. For example, the UE may store the valid TA information obtained each time, and obtain a largest value and a smallest value of valid TAs in this manner by comparing the stored TA information. In another embodiment, after obtaining the valid TA information each time, the UE may update the largest TA value or the smallest TA value based on the obtained TA information. In this case, the UE does not need to store the TA information obtained each time.

S202: Receive a CP configuration of a first PUSCH used for asynchronous uplink transmission.

In this step, the UE receives configuration information that is of the first PUSCH used for asynchronous uplink transmission and that is broadcast by a base station. The configuration information may be the CP configuration of the first PUSCH, and may indicate a length of a CP.

S203: Configured $CP \geq TA_{i,\ max}-TA_{i,\ min}+d$?

In this step, the user equipment needs to determine whether to perform asynchronous uplink transmission by using the first PUSCH. A specific manner may be that the UE determines a value relationship between the configured length of the CP of the first PUSCH (e.g., if there is a GT at an end of a frame structure, a length of the GT further needs to be considered) and a sum of a difference between a length d of a CP of a third PUSCH and a largest TA value $TA_{i,\ max}$ and a smallest TA value $TA_{i,\ min}$ of the UE, to determine whether to perform two-step random access by using the frame structure that is of the first PUSCH and that is configured by the base station.

If asynchronous uplink transmission is performed by using the frame structure that is of the PUSCH and that is configured by the base station, step S204 is performed; otherwise, step S205 is performed.

S204: Adjust a timing advance to $TA_{i,\ min}$. After this step is performed, steps S206 and S207 continue to be performed.

S205: Send a first random access preamble and/or a second PUSCH.

In this step, if it is determined that the frame structure that is of the first PUSCH and that is configured by the base station is not used to perform asynchronous uplink transmission, uplink transmission may be performed in an existing four-step random access manner, or the second PUSCH is sent through two-step random access in the prior art. Details are not described herein.

S206: Generate a CP based on a received CP configuration.

S207: Send the first PUSCH used for asynchronous uplink transmission, or a second random access preamble and the first PUSCH.

In the foregoing steps, it should be understood that, in an asynchronous uplink transmission process, the UE may perform random access without sending a preamble and only needs to send all uplink data. In the asynchronous transmission process, the UE does not need to enter an RRC connected mode.

The following describes each step in detail based on the foregoing implementation process.

Step 1: The base station broadcasts a frame structure of a Msg1 PUSCH.

How a network device broadcasts the configuration information of the first PUSCH used for asynchronous uplink transmission is discussed in this step. Specifically, in an example, how the base station broadcasts the frame structure of the first PUSCH is discussed. The frame structure of the first PUSCH includes at least a CP length configuration of the first PUSCH. How the base station determines a value of the broadcast length of the CP depends on implementation of the base station. The base station may configure, based on distribution of all the obtained TA information, a CP length that may enable most UEs to meet a condition for performing two-step random access; or may configure, based on expected CP overheads, a CP length that meets a CP overhead expectation; or may configure a CP length through any other method.

(1) There is no guard time (GT) at an end of a subframe.

Figure 8:
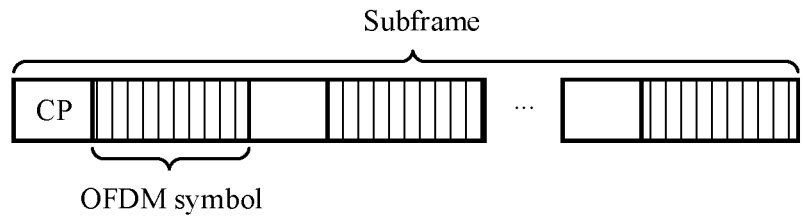
FIG. 8 is a schematic diagram of a frame structure in which no GT is inserted according to this application.

FIG. 8 is a schematic diagram of a frame structure in which no GT is inserted according to this application. A function of the GT is to protect a front part of a subsequent normal subframe from being interfered from a rear part of the first PUSCH. If all time resources in bandwidth of the first PUSCH are allocated to the first PUSCH, that is, time division multiplexing is not performed on the first PUSCH and a third PUSCH having a relatively short CP, a GT does not need to be inserted at the end of the subframe. The frame structure is shown in FIG. 8.

In the following table, the full name of OS is orthogonal frequency division multiplexing (OFDM) symbol (symbol). The second column in the table refers to a quantity of OFDM symbols in one subframe. $T_{CP}$ refers to a length of a CP, and Tos refers to a length of an OFDM symbol (other than the CP). Units are both Ts. Ts is a time unit used in standards formulated by the standards organization 3GPP.

A smallest length of a CP of a random access preamble is 3168 Ts, and lengths of CPs of a third PUSCH are 160 Ts and 144 Ts. Therefore, in this solution, the length of the CP of the first PUSCH may be greater than 160 Ts and less than 3168 Ts, and a length of a data symbol is 2048 Ts. To ensure that there are an integer quantity of data symbols in one subframe, lengths of CPs should be described in Table 1.

TABLE 1

Msg1 PUSCH CP configuration table

| CP configuration index | Number of OSs in subframe | First $T_{CP}$ | Other $T_{CP}$ | $T_{OS}$ |
|---|---|---|---|---|
| 1 | 6 | 3072 | | 2048 |
| 2 | 7 | 2344 | 2340 | 2048 |
| 3 | 8 | 1792 | | 2048 |
| 4 | 9 | 1368 | 1365 | 2048 |
| 5 | 10 | 1024 | | 2048 |
| 6 | 11 | 752 | 744 | 2048 |
| 7 | 12 | 512 | | 2048 |
| 8 | 13 | 316 | 315 | 2048 |

Table 1 is merely an example. $T_{CP}$ in the table may alternatively be another specific value, provided that it is ensured that a quantity of data symbols in one subframe is an integer. For example, $T_{CP}$ in a configuration in Table 2 or another configuration may alternatively be used.

TABLE 2

Msg1 PUSCH CP configuration table

| CP configuration index | Number of OSs in subframe | First $T_{CP}$ | Other $T_{CP}$ | $T_{OS}$ |
|---|---|---|---|---|
| 1 | 6 | 3082 | 3070 | 2048 |
| 2 | 7 | 2356 | 2338 | 2048 |
| 3 | 8 | 1806 | 1790 | 2048 |
| 4 | 9 | 1376 | 1364 | 2048 |

TABLE 2-continued

Msg1 PUSCH CP configuration table

| CP configuration index | Number of OSs in subframe | First $T_{CP}$ | Other $T_{CP}$ | $T_{OS}$ |
|---|---|---|---|---|
| 5 | 10 | 1042 | 1022 | 2048 |
| 6 | 11 | 772 | 742 | 2048 |
| 7 | 12 | 534 | 510 | 2048 |
| 8 | 13 | 328 | 314 | 2048 |

The base station only needs to broadcast a CP configuration index, and the UE can obtain, through table lookup, the CP configuration broadcast by the base station.

(2) There is a guard time (GT) at an end of a subframe.

Figure 9:
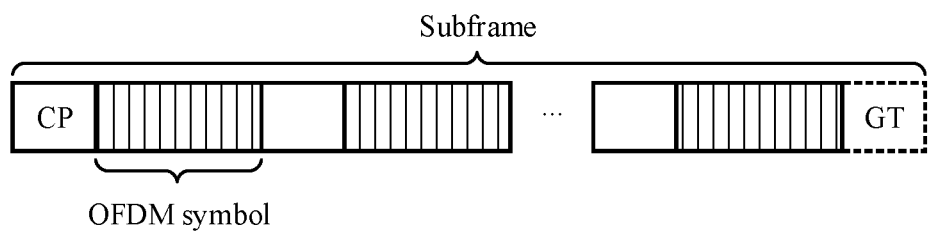
FIG. 9 is a schematic diagram of a frame structure in which a GT is inserted according to this application.

FIG. 9 is a schematic diagram of a frame structure in which a GT is inserted according to this application. When time division multiplexing is performed on the first PUSCH and a third PUSCH having a relatively short CP, a GT needs to be inserted at the end of the subframe. The frame structure is shown in FIG. 9, and lengths of CPs are shown in Table 3.

TABLE 3

Msg1 PUSCH CP configuration table

| CP configuration index | Number of OSs in subframe | First $T_{CP}$ | Other $T_{CP}$ | $T_{OS}$ | $T_{GT}$ |
|---|---|---|---|---|---|
| 1 | 6 | 2634 | 2633 | 2048 | 2633 |
| 2 | 7 | 2048 | 2048 | 2048 | 2048 |
| 3 | 8 | 1600 | 1592 | 2048 | 1592 |
| 4 | 9 | 1236 | 1228 | 2048 | 1228 |
| 5 | 10 | 940 | 930 | 2048 | 930 |
| 6 | 11 | 690 | 682 | 2048 | 682 |
| 7 | 12 | 480 | 472 | 2048 | 472 |
| 8 | 13 | 300 | 292 | 2048 | 292 |

Table 3 is merely an example. $T_{CP}$ and $T_{GT}$ in the table may alternatively be other specific values, provided that it is ensured that a quantity of data symbols in one subframe is an integer. For example, $T_{CP}$ and $T_{GT}$ in a configuration in Table 4 or another configuration may alternatively be used.

TABLE 4

Msg1 PUSCH CP configuration table

| CP configuration index | Number of OSs in subframe | $T_{CP}$ | $T_{OS}$ | $T_{GT}$ |
|---|---|---|---|---|
| 1 | 6 | 2633 | 2048 | 2634 |
| 2 | 7 | 2048 | 2048 | 2048 |
| 3 | 8 | 1592 | 2048 | 1600 |
| 4 | 9 | 1228 | 2048 | 1236 |
| 5 | 10 | 930 | 2048 | 940 |
| 6 | 11 | 682 | 2048 | 690 |
| 7 | 12 | 472 | 2048 | 480 |
| 8 | 13 | 292 | 2048 | 300 |

The base station only needs to broadcast a CP configuration index, and UE can obtain, through table lookup, the CP configuration and a GT configuration that are broadcast by the base station.

Step 2: The UE obtains the largest value and the smallest value of the valid TAs.

How the UE obtains a largest TA value and a smallest TA value that can enable the UE to correctly perform uplink transmission is obtained in this solution. For example, in a four-step random access process, when the UE 1 and the UE 2 send a same random access preamble on a same resource, the base station cannot distinguish preambles of the two UEs, that is, the base station considers that received preambles are from one UE. The base station delivers one TA value in Msg2. Because the UE 1 and the UE 2 send the same preamble on the same resource, random access-radio network temporary identifiers (RA-RNTI) of the UE 1 and the UE 2 are the same, and random access preamble identifiers (RAPID) of the UE 1 and the UE 2 are also the same. In other words, the UE 1 considers that the TA is sent to the UE 1, and the UE 2 considers that the TA is sent to the UE 2. Both the UE 1 and the UE 2 send Msg3 to the base station, and the base station sends Msg4. Msg4 carries an identifier used to indicate UE that successfully accesses a network. For the UE that successfully accesses the network, the TA value delivered in Msg2 is a valid TA value. For UE that fails to successfully access the network, the TA value delivered in Msg2 is an invalid TA value.

In addition, all TA values described in the technical solutions of this application are absolute TA values. If a TA value received by the UE at a time is a relative TA value, the UE needs to convert the TA value into an absolute TA value. For example, when the UE in an RRC connected mode receives a TA instruction MAC CE, a TA value in the TA instruction is a relative TA value, and the UE needs to convert the relative TA value into an absolute TA value by using a formula $N_{TA\_new} N_{TA\_old} + (T_A - 31) \cdot 16 \cdot 64 / 2^{\mu}$. $N_{TA\_old}$ is a current TA value of the UE, $T_A$ is the received TA instruction, and $N_{TA\_new}$ is the absolute TA value.

When the UE obtains a TA value in a common random access process or in an RRC connected mode, the UE compares the TA with $TA_{MAX}$ and $TA_{MIN}$ and updates $TA_{MAX}$ and $TA_{MIN}$, to obtain new $TA_{MAX}$ and $TA_{MIN}$. When a TA value obtained by the UE again is between $TA_{MAX}$ and $TA_{MIN}$, $TA_{MAX}$ and $TA_{MIN}$ do not need to be updated. If the TA value is greater than $TA_{MAX}$, $TA_{MAX}$ is updated to the obtained TA. If the TA value is less than $TA_{MIN}$, $TA_{MIN}$ is updated to the obtained TA value. When the UE has not obtained a difference between the largest value and the smallest value of the valid TAs, the UE does not use the frame structure that is of the first PUSCH and that is configured by the base station until the UE obtains the largest value and the smallest value of the valid TAs.

Step 3: A condition for the UE to use the frame structure of the first PUSCH.

It is discussed in this solution that the UE determines, based on a value of a change range of valid historical TAs, whether the UE meets the condition for using the frame structure of the first PUSCH. The UE may obtain the change range of the valid TAs by using the method described in Embodiment 2 of this application, or by using another method.

The condition for the UE to use the frame structure that is of the first PUSCH and that is configured by the base station is: When no GT needs to be inserted at the end of the subframe, a sum of a delay spread d and a difference between a largest value and a smallest value of the valid historical TAs of the UE is less than or equal to the length of the CP of the first PUSCH (Msg1 PUSCH) broadcast by the base station, that is, $TA_{max} - TA_{min} + d \leq T_{CP}^{Msg1PUSCH}$. When a GT needs to be inserted at the end of the subframe, the sum of the delay spread and the difference between the largest value and the smallest value of the valid historical TAs of the UE is less than or equal to the length, of the CP of the first PUSCH, that is broadcast by the base station, and the difference between the largest value and the smallest value of the valid historical TAs of the UE is less than or equal to the length, of the GT of the first PUSCH, that is broadcast by the base station, that is, $TA_{max} - TA_{min} + d \leq T_{CP}^{Msg1PUSCH}$ and $TA_{max} - TA_{min} \leq T_{GT}^{Msg1PUSCH}$.

Generally, the length of the CP of the third PUSCH is used to resist a delay spread caused by a plurality of paths. Therefore, it may be considered that a largest delay spread in a cell is less than or equal to the length of the CP of the third PUSCH, that is, $d \leq T_{CP}^{PUSCH}$. $T_{CP}^{PUSCH}$ is usually 144 Ts or 160 Ts. Because it is difficult for the UE to obtain an accurate value of the largest delay spread, the UE may replace the largest delay spread with the length of the CP of the third PUSCH. In this case, the condition for the UE to use the frame structure that is of the first PUSCH and that is configured by the base station is changed as follows: When no GT needs to be inserted at the end of the subframe, a sum of the length of the CP used for the third PUSCH and the difference between the largest value and the smallest value of the valid historical TAs of the UE is less than or equal to the length, of the CP of the first PUSCH, that is broadcast by the base station, that is, $TA_{max} - TA_{min} + T_{CP}^{PUSCH} \leq T_{CP}^{Msg1PUSCH}$. When a GT needs to be inserted at the end of the subframe, the sum of the length of the CP used for the third PUSCH and the difference between the largest value and the smallest value of the valid historical TAs of the UE is less than or equal to the length, of the CP of the first PUSCH, that is broadcast by the base station, and the difference between the largest value and the smallest value of the valid historical TAs of the UE is less than or equal to the length, of the GT of the first PUSCH, that is broadcast by the base station, that is, $TA_{max} - TA_{min} + T_{CP}^{PUSCH} \leq T_{CP}^{Msg1PUSCH}$ and $TA_{max} - TA_{min} \leq T_{GT}^{Msg1PUSCH}$.

(1) The difference between the largest value and the smallest value of the valid TAs of the UE meets the condition for the UE to use the frame structure that is of the first PUSCH and that is configured by the base station.

After the UE receives the configuration that is of the first PUSCH and that is broadcast by the base station, the UE determines a value relationship among the length of the CP of the first PUSCH, the length of the GT of the first PUSCH, and the sum of the length of the CP used for the third PUSCH and the difference between the largest value and the smallest value of the historical TAs of the UE. If the difference between the largest value and the smallest value of the valid historical TAs of the UE meets the condition for the UE to use the frame structure that is of the first PUSCH and that is configured by the base station, the frame structure that is of the first PUSCH and that is configured by the base station is used until any one of the following four values: the difference between the largest value and the smallest value of the historical TAs, the length of the CP of the third PUSCH, the length of the CP of the first PUSCH, and the length of the GT of the first PUSCH changes. When any one of the following four values: the difference between the largest value and the smallest value of the historical TAs, the length of the CP of the third PUSCH, the length of the CP of the first PUSCH, and the length of the GT of the first PUSCH changes, the UE uses a new difference between a largest value and a smallest value of the historical TAs, a new length of the CP of the third PUSCH, a new length of the CP of the first PUSCH, and a new length of the GT of the first PUSCH, to re-determine, according to this embodiment of this application, whether the difference between the largest value and the smallest value of the valid TAs of the UE meets the condition for the UE to use the frame structure that is of the first PUSCH and that is configured by the base station.

If the UE determines to use the frame structure that is of the first PUSCH and that is configured by the base station, the UE needs to adjust the timing advance of the UE to the smallest value of the valid historical TAs, that is, $TA_{min}$, and generate the CP based on the received length of the CP of the first PUSCH.

When uplink data arrives at the UE, the UE performs asynchronous uplink transmission. The UE may send only the first PUSCH, or may send the second random access preamble and the first PUSCH. Data of the first PUSCH may include a UE ID. The frame structure that is of the first PUSCH and that is configured by the base station is used for the data, and the data is sent on a resource that is of the first PUSCH and that is configured by the base station. If the second random access preamble is to be sent, a frame structure that is of a physical random access channel (PRACH) and that is configured by the base station is used for the second random access preamble, and the second random access preamble is sent on a resource that is of the PRACH and that is configured by the base station.

(2) The difference between the largest value and the smallest value of the valid TAs of the UE does not meet the condition for the UE to use the frame structure that is of the first PUSCH and that is configured by the base station.

After the UE receives the configuration that is of the first PUSCH and that is broadcast by the base station, the UE determines a value relationship among the length of the CP of the first PUSCH, the length of the GT of the first PUSCH, and the sum of the length of the CP of the third PUSCH and the difference between the largest value and the smallest value of the historical TAs of the UE. If the difference between the largest value and the smallest value of the valid historical TAs of the UE does not meet the condition for the UE to use the frame structure that is of the first PUSCH and that is configured by the base station, the frame structure that is of the first PUSCH and that is configured by the base station is not used until any one of the following four values: the difference between the largest value and the smallest value of the historical TAs, the length of the CP of the third PUSCH, the length of the CP of the first PUSCH, and the length of the GT of the first PUSCH changes. When any one of the following four values: the difference between the largest value and the smallest value of the historical TAs, the length of the CP of the third PUSCH, the length of the CP of the first PUSCH, and the length of the GT of the first PUSCH changes, the UE uses a new difference between a largest value and a smallest value of the historical TAs, a new length of the CP of the third PUSCH, a new length of the CP of the first PUSCH, and a new length of the GT of the first PUSCH, to re-determine, according to this embodiment of this application, that the difference between the largest value and the smallest value of the valid TAs of the UE meets the condition for the UE to use the frame structure that is of the first PUSCH and that is configured by the base station.

If the UE determines not to use the frame structure that is of the first PUSCH and that is configured by the base station, when uplink data arrives at the UE, the UE may send the first random access preamble by using an existing four-step random access method, that is, on a resource that is configured by the base station and that is used to send a PRACH, or may send the first random access preamble and/or the second PUSCH by using a two-step random access method in the prior art.

(3) The UE has not obtained the difference between the largest value and the smallest value of the valid TAs.

The case in which the UE has not obtained the difference between the largest value and the smallest value of the valid TAs is the same as a case in which the difference between the largest value and the smallest value of the valid TAs of the UE does not meet a condition of two-step random access, and the UE does not use the frame structure that is of the first PUSCH and that is configured by the base station until the UE obtains the largest value and the smallest value of the valid TAs. When the UE obtains the difference between the largest value and the smallest value of the valid TAs, the UE determines, according to this embodiment of this application, that the difference between the largest value and the smallest value of the valid TAs of the UE meets the condition for the UE to use the frame structure that is of the first PUSCH and that is configured by the base station.

Step 4: Hybrid automatic repeat request (HARQ) feedback for the first PUSCH.

In this solution, after the UE sends the first PUSCH by using the configuration information that is of the first PUSCH and that is configured by the network device, a HARQ feedback of the network device includes only a HARQ feedback for data. Specifically, feedbacks in the following several cases are included:

(1) HARQ feedback is performed through group common DCI.

On a UE side, the UE receives group common downlink control information scrambled by using a first radio network temporary identifier (RNTI). The group common downlink control information carries feedback information for the first PUSCH, a location of the feedback information for the first PUSCH in the group common downlink control information is determined based on a number of a demodulation reference signal for the first PUSCH, and the first RNTI is determined based on a time-frequency resource for the first PUSCH.

In a technical implementation of this solution, cyclic redundancy check (CRC) of group DCI is scrambled by using a RA-RNTI, and the RA-RNTI is determined based on a location of the time-frequency resource on which the UE sends the Msg1 PUSCH. For example, RA-RNTI=$1+s_{id}+14*t_{id}+14*X*f_{id}$, where $s_{id}$ represents an index value of the first symbol for sending the first PUSCH in a slot, $0 \leq s_{id} < 14$, $t_{id}$ represents an index value, in a radio frame, of the first slot in which the first PUSCH is sent, $0 \leq t_{id} < X$, $f_{id}$ represents a frequency domain index value for sending the first PUSCH, and $0 \leq f_{id} < Y$.

Figure 10:
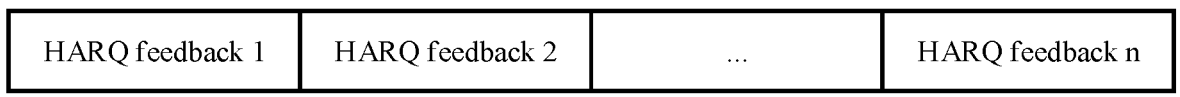
FIG. 10 is a schematic diagram of a format of group DCI fed back for a PUSCH according to this application.

FIG. 10 is a schematic diagram of a format of group DCI fed back for a PUSCH according to this application. When first PUSCHs of a plurality of UEs are sent on a same time-frequency resource, RA-RNTIs of the UEs are the same. Therefore, HARQ feedbacks for the UEs belong to one group DCI. A format of the group DCI is shown in FIG. 10. A location of the HARQ feedback for the UE in the group DCI is determined by the number of the demodulation reference signal that is of the first PUSCH and that is sent by the UE. The number of the demodulation reference signal for the first PUSCH may be a port number of the demodulation reference signal for the first PUSCH. For example, when a sequence number of the DMRS used by the UE in the first PUSCH is 2, the HARQ feedback for the UE is a HARQ feedback 2 in the group DCI, and n in the figure represents a quantity of UEs.

Content of the HARQ feedback may be an ACK, a NACK, or an uplink grant (UL grant).

In another embodiment, HARQ feedback may be performed through UE-specific DCI. For example, the UE receives first DCI scrambled by using a second RNTI, where the first DCI carries HARQ feedback information for the first PUSCH, and the second RNTI is determined based on a time-frequency resource for the first PUSCH and a number of a demodulation reference signal for the first PUSCH.

(2) HARQ feedback is performed through Msg2 for single UE

On a UE side, the UE receives second DCI used for scheduling a first physical downlink shared channel (PDSCH) and the first PDSCH. The first PDSCH carries feedback information for the first PUSCH. The feedback information includes a number of a demodulation reference signal for the first PUSCH and HARQ feedback information for the first PUSCH. The number of the demodulation reference signal for the first PUSCH may be a port number of the demodulation reference signal for the first PUSCH.

In this solution, the base station sends a PDCCH to schedule the PDSCH used to transmit Msg2. CRC of the PDCCH is scrambled by using a RA-RNTI, and the RA-RNTI is determined based on a location of a time-frequency resource on which the UE sends the first PUSCH and a sequence number of the used DMRS. For example, RA-RNTI=1+$s_{id}$+14*$t_{id}$+14*X*$f_{id}$+14*X*Y*$DMRS_{id}$, where $s_{id}$ represents an index value of the first symbol for sending the first PUSCH in a slot, $0 \leq s_{id} < 14$, $t_{id}$ represents an index value, in a radio frame, of the first slot in which the first PUSCH is sent, $0 \leq t_{id} < X$, $f_{id}$ represents a frequency domain index value for sending the first PUSCH, $0 \leq f_{id} < Y$, and $DMRS_{id}$ indicates an index value of the DMRS selected by the UE.

Content of Msg2 is a HARQ feedback for single UE, and content of the HARQ feedback may be an ACK, a NACK, or a UL grant.

(3) HARQ feedback is performed through Msg2 for a plurality of UEs (3) is similar to (2), and the base station sends a PDCCH to schedule a PDSCH used to transmit Msg2. CRC of the PDCCH is scrambled by using a RA-RNTI, and the RA-RNTI is determined based on a location of a time-frequency resource on which the UE sends the first PUSCH. For example, RA-RNTI=1+$s_{id}$+14*$t_{id}$ 14*X*$f_{id}$, where $s_{id}$ represents an index value of the first symbol for sending the first PUSCH in a slot, $0 \leq s_{id} < 14$, $t_{id}$ represents an index value, in a radio frame, of the first slot in which the first PUSCH is sent, $0 \leq t_{id} < X$, $f_{id}$ represents a frequency domain index value for sending the first PUSCH, and $0 \leq f_{id} < Y$.

Figure 11:
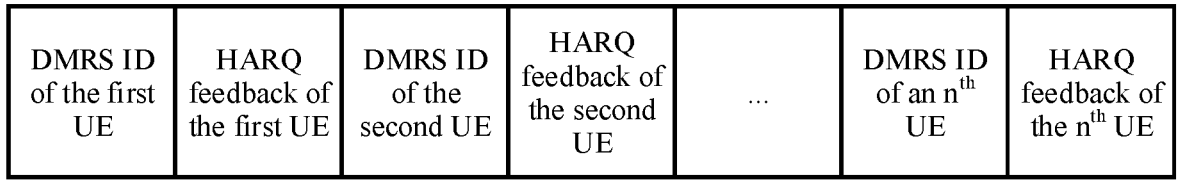
FIG. 11 is a schematic diagram of a format of Msg2 fed back for PUSCHs of a plurality of UEs according to this application.
Figure 12:
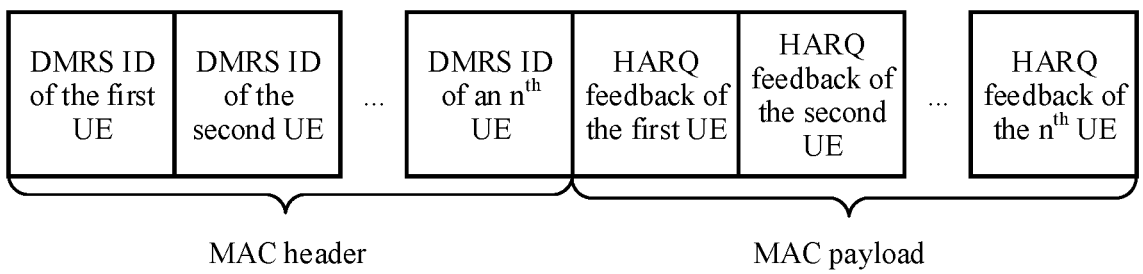
FIG. 12 is another schematic diagram of a format of Msg2 fed back for PUSCHs of a plurality of UEs according to this application.

FIG. 11 is a schematic diagram of a format of Msg2 fed back for PUSCHs of a plurality of UEs according to this application; FIG. 12 is another schematic diagram of a format of Msg2 fed back for PUSCHs of a plurality of UEs according to this application. When Msg1 PUSCHs of a plurality of UEs are sent on a same time-frequency resource, RA-RNTIs of the UEs are the same. Therefore, HARQ feedbacks for the UEs are in same Msg2. A format of Msg2 is shown in FIG. 11 and FIG. 12. The UE determines a location of a HARQ feedback for the UE in Msg2 based on a number of a demodulation reference signal for sending the first PUSCH by the UE. The number of the demodulation reference signal for the first PUSCH may be a port number of the demodulation reference signal for the first PUSCH.

(4) A HARQ-ACK is fed back through Msg2 for a plurality of UEs.

If the base station correctly decodes the first PUSCH, the base station may obtain the UE ID in the first PUSCH. Therefore, the base station may feed back, in the message Msg2, UE IDs and HARQ-ACKs corresponding to different UEs to the UEs. Because the base station can obtain, only after correctly decoding the first PUSCH, the ID sent to the UE of the first PUSCH, the base station may feed back only the UE ID in the message Msg2, to indicate that the PUSCH sent by the UE corresponding to the UE ID is correctly decoded.

The base station sends a PDCCH to schedule a PDSCH used to transmit Msg2. CRC of the PDCCH is scrambled by using a RA-RNTI, and the RA-RNTI is determined based on a location of a time-frequency resource on which the UE sends the first PUSCH. For example, RA-RNTI=1+$s_{id}$+ 14*$t_{id}$ 14*X*$f_{id}$, where $s_{id}$ represents an index value of the first symbol for sending the first PUSCH in a slot, $0 \leq s_{id} < 14$, $t_{id}$ represents an index value, in a radio frame, of the first slot in which the first PUSCH is sent, $0 \leq t_{id} < X$, $f_{id}$ represents a frequency domain index value for sending the first PUSCH, and $0 \leq f_{id} < Y$.

FIG. 13 is still another schematic diagram of a format of Msg2, as a feedback for a PUSCH, for a plurality of UEs according to this application; FIG. 14 is yet another schematic diagram of a format of Msg2, as a feedback for a PUSCH, for a plurality of UEs according to this application. When Msg1 PUSCHs of a plurality of UEs are sent on a same time-frequency resource, RA-RNTIs of the UEs are the same. Therefore, HARQ-ACKs for the UEs are in same Msg2. A format of Msg2 is shown in FIG. 13 and FIG. 14. The UE determines a location of the HARQ-ACK for the UE in Msg2 based on the UE ID.

In this solution, optionally, on a UE side, the UE further receives third DCI used for scheduling a second PDSCH and the second PDSCH, where the second PDSCH carries feedback information for the first PUSCH, and the feedback information includes the UE ID and HARQ feedback information for the first PUSCH. In other words, feedback is performed on the second PDSCH.

(5) A HARQ-ACK is implicitly indicated.

The base station indicates, only in the foregoing several manners, the HARQ-NACK or UL grant for retransmission scheduling to indicate a NACK. If the UE does not receive the HARQ-NACK or the UL grant for retransmission scheduling within a pre-agreed time, the HARQ-ACK is implicitly indicated.

(6) HARQ feedback is not performed.

For some services that do not have a high requirement for reliability, the base station may not perform HARQ feedback. In other words, the UE performs repeated transmission based on a preconfigured repetition quantity, and after completing preconfigured repeated transmission, if there is other data that needs to be transmitted, the UE continues to transmit a next data packet, or if there is no other data that needs to be transmitted, the UE stops transmission.

It should be noted that scrambling DCI in this application may be considered as scrambling CRC of the DCI.

Based on the descriptions of the foregoing embodiment, this application proposes asynchronous uplink data transmission with low CP overheads. The base station broadcasts a low-overhead frame structure used for transmission of the first PUSCH. The frame structure includes the length of the CP (e.g., if a GT is inserted at the end of the subframe, the length of the GT further needs to be considered). The UE determines, based on a relationship among the largest value and the smallest value of the valid TAs of the UE, the length of the CP of the third PUSCH, and the length of the CP of the first PUSCH, whether the frame structure used for transmission of the first PUSCH can be used to transmit the first PUSCH. CP overheads of the UE that meets the condition for using the frame structure of the first PUSCH can be reduced, and resource utilization can be improved. In addition, the UE that does not meet the condition for using the frame structure of the first PUSCH can be prevented from abusing the frame structure of the first PUSCH, not to cause interference to another user.

FIG. 15 is a schematic structural diagram of Embodiment 1 of user equipment according to this application. As shown in FIG. 15, the user equipment 10 provided in this application includes:

a receiving module 11, configured to receive configuration information of a first PUSCH from a network device, where the configuration information includes a length of a CP of the first PUSCH, and the length of the CP of the first PUSCH is less than a length of a CP of a first random access preamble;

a processing module 12, configured to determine, based on the length of the CP of the first PUSCH, a difference between a largest stored TA and a smallest stored TA, and a largest delay spread, whether to send the first PUSCH; and a sending module 13, configured to send, if it is determined to send the first PUSCH, the first PUSCH based on the configuration information of the first PUSCH.

The user equipment provided in this embodiment is configured to perform the technical solution on a user equipment side in any one of the foregoing method embodiments. An implementation principle and technical effects of the user equipment are similar to those in the foregoing method embodiment. Details are not described herein again.

Based on the foregoing embodiment, in another specific implementation of the user equipment, the processing module 12 is specifically configured to:

if a difference between the length of the CP of the first PUSCH and the largest delay spread is greater than or equal to the difference between the largest stored TA and the smallest stored TA, determine to send the first PUSCH.

Optionally, the processing module 12 is specifically configured to:

determine, based on the length of the CP of the first PUSCH, a length of a guard time GT of the first PUSCH, the difference between the largest stored TA and the smallest stored TA, and the largest delay spread, whether to send the first PUSCH.

Optionally, the processing module 12 is specifically configured to:

if a difference between the length of the CP of the first PUSCH and the largest delay spread is greater than or equal to the difference between the largest stored TA and the smallest stored TA, and the length of the GT is greater than or equal to the difference between the largest stored TA and the smallest stored TA, determine to send the first PUSCH.

Optionally, the sending module 13 is specifically configured to adjust uplink timing based on the smallest stored TA, and send the first PUSCH based on the adjusted uplink timing.

Optionally, the sending module 13 is further configured to send a second random access preamble based on the adjusted uplink timing.

Optionally, the first PUSCH carries an identity ID of the UE.

Optionally, the receiving module 11 is further configured to:

receive group common downlink control information (DCI) scrambled by using a first RNTI, where the group common downlink control information carries feedback information for the first PUSCH, a location of the feedback information for the first PUSCH in the group common downlink control information is determined based on a number of a demodulation reference signal for the first PUSCH, and the first RNTI is determined based on a time-frequency resource for the first PUSCH; or receive first DCI scrambled by using a second RNTI, where the first DCI carries feedback information for the first PUSCH, and the second RNTI is determined based on a time-frequency resource for the first PUSCH and a number of a demodulation reference signal for the first PUSCH; or receive second DCI used for scheduling a first PDSCH and the first PDSCH, where the first PDSCH carries feedback information for the first PUSCH, and the feedback information includes a number of a demodulation reference signal for the first PUSCH and hybrid automatic repeat request HARQ feedback information for the first PUSCH; or receive third DCI used for scheduling a second physical downlink shared channel PDSCH and the PDSCH, where the second PDSCH carries feedback information for the first PUSCH, and the feedback information includes the identity of the user equipment and HARQ feedback information for the first PUSCH.

Optionally, if the processing module 12 determines not to send the first PUSCH, the sending module 13 is further configured to send the first random access preamble and/or a second PUSCH to the network device, where a length of a CP of the second PUSCH is greater than or equal to the length of the CP of the first random access preamble.

In the foregoing solution, it should be understood that the number of the demodulation reference signal for the first PUSCH may be a port number of the demodulation reference signal for the first PUSCH or the like. This is not limited in this solution.

The user equipment provided in any one of the foregoing implementations is configured to perform the technical solution on the user equipment side in any one of the foregoing method embodiments. The implementation principle and the technical effects of the user equipment are similar to those in the foregoing method embodiment. Details are not described herein again.

Figure 16:
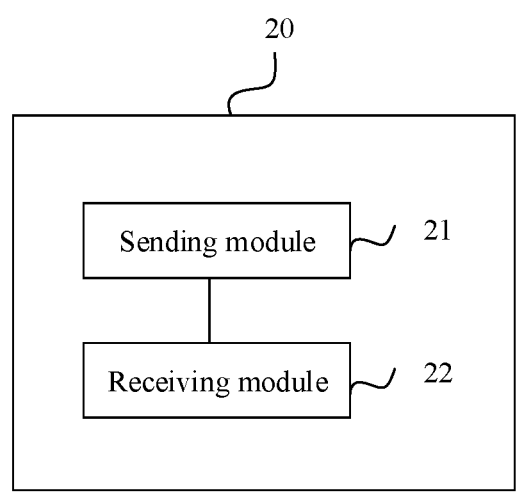
FIG. 16 is a schematic structural diagram of Embodiment 1 of a network device according to this application.

FIG. 16 is a schematic structural diagram of Embodiment 1 of a network device according to this application. As shown in FIG. 16, the network device 20 provided in this application includes:

a sending module 21, configured to send configuration information of a PUSCH used for asynchronous uplink transmission, where the configuration information includes resource configuration information of the PUSCH and a length of a CP of the PUSCH, and the length of the CP of the PUSCH is less than a length of a CP of a random access preamble; and a receiving module 22, configured to receive the PUSCH sent based on the configuration information of the PUSCH.

Optionally, the sending module 21 is further configured to:

send group common downlink control information scrambled by using a first RNTI, where the group common downlink control information carries feedback information for the PUSCH, a location of the feedback information for the PUSCH in the group common downlink control information is determined based on a number of a demodulation reference signal for the PUSCH, and the first RNTI is determined based on a time-frequency resource for the PUSCH; or send first DCI scrambled by using a second RNTI, where the first DCI carries feedback information for the PUSCH, and the second RNTI is determined based on a time-frequency resource for the PUSCH and a number of a demodulation reference signal for the PUSCH; or send second DCI used for scheduling a first physical downlink shared channel PDSCH and the first PDSCH, where the first PDSCH carries feedback information for the PUSCH, and the feedback information includes a number of a demodulation reference signal for the PUSCH and HARQ feedback information for the PUSCH; or send third DCI used for scheduling a second PDSCH and the second PDSCH, where the second PDSCH carries feedback information for the PUSCH, and the feedback information includes an identity of UE and HARQ feedback information for the PUSCH.

In the foregoing solution, it should be understood that the number of the demodulation reference signal for the first PUSCH may be a port number of the demodulation reference signal for the first PUSCH or the like. This is not limited in this solution.

The network device provided in this embodiment is configured to perform the technical solutions on a network device side in any one of the foregoing method embodiments. An implementation principle and a technical effect of the network device are similar. Details are not described herein again.

This application further provides user equipment, including a transmitter, a receiver, a memory, and a processor. The memory is configured to store a computer program. The processor executes the computer program, and controls components such as the receiver and the transmitter to implement the asynchronous uplink transmission method on a user equipment side in any one of the foregoing method embodiments.

This application further provides a network device, including a transmitter, a receiver, a memory, and a processor. The memory is configured to store a computer program. The processor executes the computer program, and controls components such as the receiver and the transmitter to implement the asynchronous uplink transmission method on a network device side in any one of the foregoing method embodiments.

In a specific implementation of the foregoing user equipment or network device, there is at least one processor, configured to execute an executable instruction, that is, the computer program, stored in the memory. In this way, the network device exchanges data with the user equipment through a communications interface, to perform the asynchronous uplink transmission method provided in the foregoing various implementations. Optionally, the memory may be further integrated in the processor.

An embodiment of this application provides a chip. The chip is configured to support UE in implementing a function of asynchronous uplink transmission in the embodiments of this application, for example, sending or processing data and/or information in the foregoing method. The chip is specifically used in a chip system, and the chip system may include the chip, or may include the chip and another discrete device. When a chip in the UE implements the foregoing asynchronous uplink transmission method, the chip includes a processing unit and a communications unit. The processing unit may be, for example, a processor, and the communications unit may be, for example, an input/output interface, a pin, or a circuit. The processing unit performs all or some actions performed by the processing module of the user equipment in the embodiments of this application, and the communications unit may perform corresponding actions performed by the receiving module and the sending module of the user equipment in the embodiments of this application. For example, when the receiving module of the user equipment receives a radio frequency signal, the communications unit receives a baseband signal corresponding to the radio frequency signal. When the sending module of the user equipment sends a radio frequency signal, the communications unit sends a baseband signal corresponding to the radio frequency signal. In another specific embodiment, the user equipment in this application may be a chip. In other words, the processing module of the user equipment is a processing unit of the chip, and the receiving module and the sending module of the user equipment are a communications unit of the chip.

An embodiment of this application provides a chip. The chip is configured to support a network device in implementing a function of asynchronous uplink transmission in the embodiments of this application, for example, sending or processing data and/or information in the foregoing method. The chip is specifically used in a chip system, and the chip system may include the chip, or may include the chip and another discrete device. When a chip in the network device implements the foregoing asynchronous uplink transmission method, the chip includes a processing unit and a communications unit. The processing unit may be, for example, a processor, and the communications unit may be, for example, an input/output interface, a pin, or a circuit. The processing unit performs all or some actions performed by a processing module of the network device in the embodiments of this application, and the communications unit may perform corresponding actions performed by the receiving module and the sending module of the network device in the embodiments of this application. For example, when the receiving module of the network device receives a radio frequency signal, the communications unit receives a baseband signal corresponding to the radio frequency signal. When the sending module of the network device sends a radio frequency signal, the communications unit sends a baseband signal corresponding to the radio frequency signal. In another specific embodiment, the network device in this application may be specifically a chip. In other words, the processing module of the network device is a processing unit of the chip, and the receiving module and the sending module of the network device are a communications unit of the chip.

This application further provides a storage medium. The storage medium is configured to store a computer program, and the computer program is used to implement the asynchronous uplink transmission method on a user equipment side in the foregoing method embodiments.

This application further provides a storage medium. The storage medium is configured to store a computer program, and the computer program is used to implement the asynchronous uplink transmission method on a network device side in the foregoing method embodiments.

This application further provides a computer program product. When the computer program product is run on a computer, the computer is enabled to perform the technical solutions on a user equipment side in the foregoing method embodiments.

This application further provides a computer program product. When the computer program product is run on a computer, the computer is enabled to perform the technical solutions on a network device side in the foregoing method embodiments.

In a specific implementation of the foregoing user equipment or network device, it should be understood that the processor may be a central processing unit (CPU), or may be another general purpose processor, a digital signal processor (DSP), an application-specific integrated circuit (ASIC), or the like. The general purpose processor may be a microprocessor, or the processor may be any conventional processor or the like. The steps of the methods disclosed with reference to this application may be directly performed by a hardware processor, or may be performed by a combination of hardware and a software module in the processor.

All or some of the steps of the foregoing method embodiments may be implemented by using a program by instructing related hardware. The foregoing program may be stored in a readable memory. When the program is executed, the steps of the methods in the embodiments are performed. The memory (storage medium) includes: a read-only memory (ROM), a RAM, a flash memory, a hard disk, a solid-state drive, a magnetic tape, a floppy disk, an optical disc, and any combination thereof.

What is claimed is:

1. User equipment, comprising:
   a receiver, configured to receive, from a network device, configuration information of a first physical uplink shared channel (PUSCH) used for asynchronous uplink transmission, wherein the configuration information comprises resource configuration information of the first PUSCH and a length of a cyclic prefix (CP) of the first PUSCH, and the length of the CP of the first PUSCH is less than a length of a CP of a first random access preamble;
   a processor, configured to determine, based on the length of the CP of the first PUSCH, a difference between a largest stored timing advance (TA) and a smallest stored TA, and a largest delay spread, whether to send the first PUSCH; and
   a transmitter, configured to send, responsive to determining to send the first PUSCH, the first PUSCH based on the configuration information of the first PUSCH.

2. The user equipment according to claim 1, wherein the processor is specifically configured to:
   responsive to determining that a difference between the length of the CP of the first PUSCH and the largest delay spread is greater than or equal to the difference between the largest stored TA and the smallest stored TA, determine to send the first PUSCH.

3. The user equipment according to claim 1, wherein the processor is specifically configured to:
   determine, based on the length of the CP of the first PUSCH, a length of a guard time GT of the first PUSCH, the difference between the largest stored TA and the smallest stored TA, and the largest delay spread, whether to send the first PUSCH.

4. The user equipment according to claim 3, wherein the processor is specifically configured to:
   responsive to determining that a difference between the length of the CP of the first PUSCH and the largest delay spread is greater than or equal to the difference between the largest stored TA and the smallest stored TA, and the length of the GT is greater than or equal to the difference between the largest stored TA and the smallest stored TA, determine to send the first PUSCH.

5. The user equipment according to claim 1, wherein the transmitter is specifically configured to adjust an uplink timing based on the smallest stored TA, and send the first PUSCH based on the adjusted uplink timing.

6. The user equipment according to claim 5, wherein the transmitter is further configured to send a second random access preamble based on the adjusted uplink timing.

7. The user equipment according to claim 1, wherein the receiver is further configured to:
   receive group common downlink control information (DCI) scrambled by using a first radio network temporary identifier (RNTI), wherein the group common DCI carries feedback information for the first PUSCH, a location of the feedback information for the first PUSCH in the group common DCI is determined based on a number of a demodulation reference signal for the first PUSCH, and the first RNTI is determined based on a time-frequency resource for the first PUSCH; or
   receive first DCI scrambled by using a second RNTI, wherein the first DCI carries feedback information for the first PUSCH, and the second RNTI is determined based on a time-frequency resource for the first PUSCH and a number of a demodulation reference signal for the first PUSCH; or
   receive second DCI used for scheduling a first physical downlink shared channel (PDSCH) and the first PDSCH, wherein the first PDSCH carries feedback information for the first PUSCH, and the feedback information comprises a number of a demodulation reference signal for the first PUSCH and hybrid automatic repeat request (HARQ) feedback information for the first PUSCH; or
   receive third DCI used for scheduling a second PDSCH and the second PDSCH, wherein the second PDSCH carries feedback information for the first PUSCH, and the feedback information comprises an identity of the user equipment and HARQ feedback information for the first PUSCH.

8. An asynchronous uplink transmission method, wherein the method comprises:
   sending, by a network device, configuration information of a physical uplink shared channel (PUSCH) used for asynchronous uplink transmission, wherein the configuration information comprises a length of a cyclic prefix (CP) of the PUSCH, and the length of the CP of the PUSCH is less than a length of a CP of a random access preamble; and
   receiving, by the network device, the PUSCH sent based on the configuration information of the PUSCH,
   wherein the method further comprises:
   sending, by the network device, group common downlink control information (DCI) scrambled by using a first radio network temporary identifier (RNTI), wherein the group common DCI carries feedback information for the PUSCH, a location of the feedback information for the PUSCH in the group common DCI is determined based on a number of a demodulation reference signal for the PUSCH, and the first RNTI is determined based on a time-frequency resource for the PUSCH; or
   sending, by the network device, first DCI scrambled by using a second RNTI, wherein the first DCI carries feedback information for the PUSCH, and the second RNTI is determined based on a time-frequency resource for the PUSCH and a number of a demodulation reference signal for the PUSCH; or
   sending, by the network device, second DCI used for scheduling a first physical downlink shared channel (PDSCH) and the first PDSCH, wherein the first PDSCH carries feedback information for the PUSCH, and the feedback information comprises a number of a demodulation reference signal for the PUSCH and hybrid automatic repeat request (HARQ) feedback information for the PUSCH; or
   sending, by the network device, third DCI used for scheduling a second PDSCH and the second PDSCH, wherein the second PDSCH carries feedback information for the PUSCH, and the feedback information comprises an identity of a UE and HARQ feedback information for the PUSCH.

9. A network device, comprising:

a transmitter, configured to send configuration information of a physical uplink shared channel (PUSCH) used for asynchronous uplink transmission, wherein the configuration information comprises a length of a cyclic prefix (CP) of the PUSCH, and the length of the CP of the PUSCH is less than a length of a CP of a random access preamble; and a receiver, configured to receive the PUSCH sent based on the configuration information of the PUSCH, wherein the transmitter is further configured to:

send group common downlink control information (DCI) scrambled by using a first radio network temporary identifier (RNTI), wherein the group common downlink control information carries feedback information for the PUSCH, a location of the feedback information for the PUSCH in the group common downlink control information is determined based on a number of a demodulation reference signal for the PUSCH, and the first RNTI is determined based on a time-frequency resource for the PUSCH; or send first DCI scrambled by using a second RNTI, wherein the first DCI carries feedback information for the PUSCH, and the second RNTI is determined based on a time-frequency resource for the PUSCH and a number of a demodulation reference signal for the PUSCH; or send second DCI used for scheduling a first physical downlink shared channel (PDSCH) and the first PDSCH, wherein the first PDSCH carries feedback information for the PUSCH, and the feedback information comprises a number of a demodulation reference signal for the PUSCH and hybrid automatic repeat request (HARQ) feedback information for the PUSCH; or send third DCI used for scheduling a second PDSCH and the second PDSCH wherein the second PDSCH carries feedback information for the PUSCH, and the feedback information comprises an identity of UE and HARQ feedback information for the PUSCH.

* * * * *